United States Patent
Vuylsteke et al.

(10) Patent No.: US 10,638,896 B2
(45) Date of Patent: *May 5, 2020

(54) SYSTEMS, METHODS, AND APPARATUSES FOR DISPENSING SHEETS OF MATERIAL

(71) Applicant: Tranzonic Companies, Cleveland, OH (US)

(72) Inventors: Kenneth F. Vuylsteke, Rancho Santa Fe, CA (US); Michael Duane Blanchard, Knoxville, TN (US); Atilla Rist, Augsburg (DE); Hans Van Reenen, The Hague (NL)

(73) Assignee: Tranzonic Companies, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,989

(22) Filed: Jun. 5, 2019

(65) Prior Publication Data

US 2019/0282044 A1    Sep. 19, 2019

Related U.S. Application Data

(63) Continuation of application No. 16/214,594, filed on Dec. 10, 2018, now Pat. No. 10,314,445, which is a continuation of application No. 15/313,495, filed as application No. PCT/US2016/031363 on May 6, 2016, now Pat. No. 10,149,583.

(30) Foreign Application Priority Data

May 12, 2015  (EP) .................................... 15001414

(51) Int. Cl.
*A47K 17/00*    (2006.01)
*A47K 13/16*    (2006.01)

(52) U.S. Cl.
CPC .......... *A47K 17/003* (2013.01); *A47K 13/165* (2013.01)

(58) Field of Classification Search
None
See application file for complete search history.

(56) References Cited

U.S. PATENT DOCUMENTS 10,149,583 B2 *  12/2018  Vuylsteke ............ A47K 17/003
10,314,445 B2 *   6/2019  Vuylsteke ............ A47K 17/003

* cited by examiner

*Primary Examiner* — Jacob S. Scott
*Assistant Examiner* — Ayodeji T Ojofeitimi
(74) *Attorney, Agent, or Firm* — Taft Stettinius & Hollister LLP; Ryan O. White

(57) ABSTRACT

A sheet material dispensing apparatus, including a shaft operatively connected to a supply roller and a retracting roller, wherein the retracting roller has a radiused portion and at least one truncated portion; a motor configured to cause the shaft to rotate; an activating cam operatively connected to the supply roller; a microswitch operatively associated with the activating cam, the microswitch being configured to limit operation of the motor; a supporting plate engaged and disengaged by the retracting roller during operation, wherein the disengagement of the radiused portion from the supporting plate causes the supply roller to translate toward a wall of the apparatus; and at least one article of sheet material housed within the apparatus.

20 Claims, 17 Drawing Sheets

SYSTEMS, METHODS, AND APPARATUSES FOR DISPENSING SHEETS OF MATERIAL

CROSS-REFERENCE TO RELATED APPLICATIONS

This is a continuation application of U.S. patent application Ser. No. 16/214,594, filed Dec. 10, 2018, which is in turn a continuation application of U.S. patent application Ser. No. 15/313,495, filed Nov. 22, 2016, now U.S. Pat. No. 10,149,583, which is in turn a U.S. national stage application under 35 U.S.C. § 371 of PCT International Application Serial No. PCT/US2016/031363, which has an international filing date of May 6, 2016, designates the United States of America, and claims the benefit of European Patent Application No. 15001414.0, which was filed on May 12, 2015. The contents of all of the aforementioned patent applications are hereby incorporated by reference for all purposes as if fully set forth herein.

BACKGROUND OF THE INVENTION

Reliably dispensing sheets of material, including for example paper products from a stack of joined paper products, is often difficult. For example, the stack of material sheets may be joined at one end in a manner such that the application of an appropriate force upon a single sheet will cause it to separate from the remainder of material sheets. In many dispensers of such materials, a mechanical arm may contact the outermost sheet in the stack and tear it away from the remainder of the stack. However, the mechanical arm often contacts the sheet material in a very small area relative to the area of the sheet material itself. As a result, where the material sheets do not have great tensile strength, the sheets are prone to tearing during dispensing. Additionally, the mechanical arm may not disengage the outermost sheet after the outermost sheet is torn away from the remainder of the stack, causing difficulty in the ultimate removal of the sheet material from the dispenser. One such example of the dispensing of material sheets is in the use of thin material sheets used to provide a sanitary barrier between a user of a device and the device, including for example, toilet seat covers.

What is needed is a more reliable system, method, and apparatus for dispensing sheets of material. The present application appreciates that providing such a system, method, and apparatus may be a challenging endeavor.

SUMMARY OF THE INVENTION

In accordance with one embodiment, a sheet material dispensing apparatus comprises a shaft operatively connected to a supply roller and a retracting roller, wherein the retracting roller has a radiused portion and at least one truncated portion; a motor configured to cause the shaft to rotate; an activating cam operatively connected to the supply roller; a microswitch operatively associated with the activating cam, the microswitch being configured to limit operation of the motor; a supporting plate engaged and disengaged by the retracting roller during operation, wherein the disengagement of the radiused portion from the supporting plate causes the supply roller to translate toward a wall of the apparatus; and at least one article of sheet material housed within the apparatus.

According to another embodiment, a sheet material dispensing apparatus is provided and comprises at least one article of sheet material housed within the apparatus and configured to be dispensed therefrom; a shaft operatively connected to a supply roller and a retracting roller, wherein the retracting roller has a radiused portion and at least one truncated portion; a motor configured to cause the shaft to rotate; a sensor configured to activate the motor; an activating cam operatively connected to the supply roller, the activating cam including a microswitch configured to limit operation of the motor after activation by the sensor; a supporting plate engaged and disengaged by the retracting roller during operation, wherein the disengagement of the radiused portion from the supporting plate causes the supply roller to translate toward a wall of the apparatus; and a flexible mounting plate operatively connected to at least one of the supply roller, the retracting roller and the shaft, wherein the flexible mounting plate is configured to deflect or bend about at least one supporting tab during dispensing of the at least one article of sheet material.

According to yet another embodiment, a sheet material dispensing apparatus, comprises a cover; a rear wall connected to the cover; a flexible mounting plate operatively connected to the cover; a shaft connected to the mounting plate; a motor operatively connected to the shaft; a supply roller connected to the shaft, the supply roller having a radiused portion and at least one truncated portion; and a microswitch activating cam extending from a side of the supply roller, the microswitch activating cam being operable to contact a microswitch fixed on the mounting plate to stop the motor. The apparatus further comprises a retracting roller connected to the shaft, wherein the retracting roller has a radiused portion, and at least one truncated portion; and a supporting plate engaged and disengaged by the retracting roller during operation, wherein the disengagement of the radiused portion from the supporting plate causes the supply roller to translate toward the rear wall.

In one embodiment, a sheet material dispensing apparatus is provided, the apparatus comprising: a cover; a rear wall connected to the cover; a mounting plate operatively connected to the cover; a shaft, wherein the shaft is connected to the mounting plate; a supply roller connected to the shaft, wherein the supply roller has a radiused portion and at least one truncated portion; and a retracting roller connected to the shaft, wherein the retracting roller has a radiused portion, and at least one truncated portion.

In another embodiment, a sheet material dispensing apparatus is provided, the apparatus comprising: a cover; a rear wall connected to the cover; a flexible mounting plate operatively connected to the cover; a shaft, wherein the shaft is connected to the mounting plate; a motor operatively connected to the shaft; a supply roller connected to the shaft, wherein the supply roller has a radiused portion and at least one truncated portion; and a retracting roller connected to the shaft, wherein the retracting roller has a radiused portion, and at least one truncated portion.

In another embodiment, a sheet material dispensing apparatus is provided, the apparatus comprising: a cover; a rear wall connected to the cover; a mounting plate operatively connected to the cover; a shaft, wherein the shaft is connected to the mounting plate; a supply roller connected to the shaft, wherein the supply roller has a radiused portion and at least one truncated portion; a retracting roller connected to the shaft, wherein the retracting roller has a radiused portion, and at least one truncated portion; and a supporting plate engaged and disengaged by the retracting roller during operation, wherein the disengagement of the retracting roller from the supporting plate causes the supply roller to translate toward the rear wall.

BRIEF DESCRIPTION OF THE DRAWINGS

The accompanying figures, which are incorporated in and constitute a part of the specification, illustrate various example apparatuses, systems, and methods, and are used merely to illustrate various example embodiments.

FIG. 5I illustrates an example arrangement of retracting roller 520, sheet supply roller 514, and sheet material 512.

DETAILED DESCRIPTION

Sheet material dispensers, such as that disclosed in European Patent Application Publication No. EP2522265 (A1), may utilize feed rollers in order to advance a sheet material from a sheet material storage device, such as a card of sheet products. The sheet material may be attached in a stack to the card (which may include a substrate configured to be attached to the interior of the dispenser) via a perforated, or otherwise limited, connection, such that the application of a force pulling the sheet material away from the card may cause it to separate at predesignated points. A single layer of sheet material may be accordingly advanced out of the dispenser so as to permit manipulation of the sheet material by a user, including allowing a user to grasp the sheet material and remove it completely from the dispenser. European Patent Application Publication No. EP2522265 (A1) is incorporated by reference herein in its entirety.

In one embodiment, the various dispensing apparatuses disclosed herein may be used for a specific purpose, including for example, the dispensing of thin paper toilet seat covers. The toilet seat covers may be contained and/or dispensed in a substantially flat state. The toilet seat covers may be contained and/or dispensed in a substantially folded state, so as to reduce the necessary size of the dispensing apparatus. However, it is understood that the various dispensing apparatuses disclosed herein may be used to dispense any of a variety of sheet materials from an internal storage area, including for example: a paper, a cardboard, a polymer, a metal, an alloy, an organic material, a textile, and the like. Further, it is understood that the various dispensing apparatuses disclosed herein may be used to dispense any sheet material contained on a card of sheet products.

In one embodiment, the various dispensing apparatuses disclosed herein may be used to dispense a perforated towel. In one embodiment, the various dispensing apparatuses disclosed herein may be used to dispense at least one of a flat fold towel, a soft fold towel, an inter-fold towel, a continuous roll towel, and a perforated roll towel.

Figure 1:
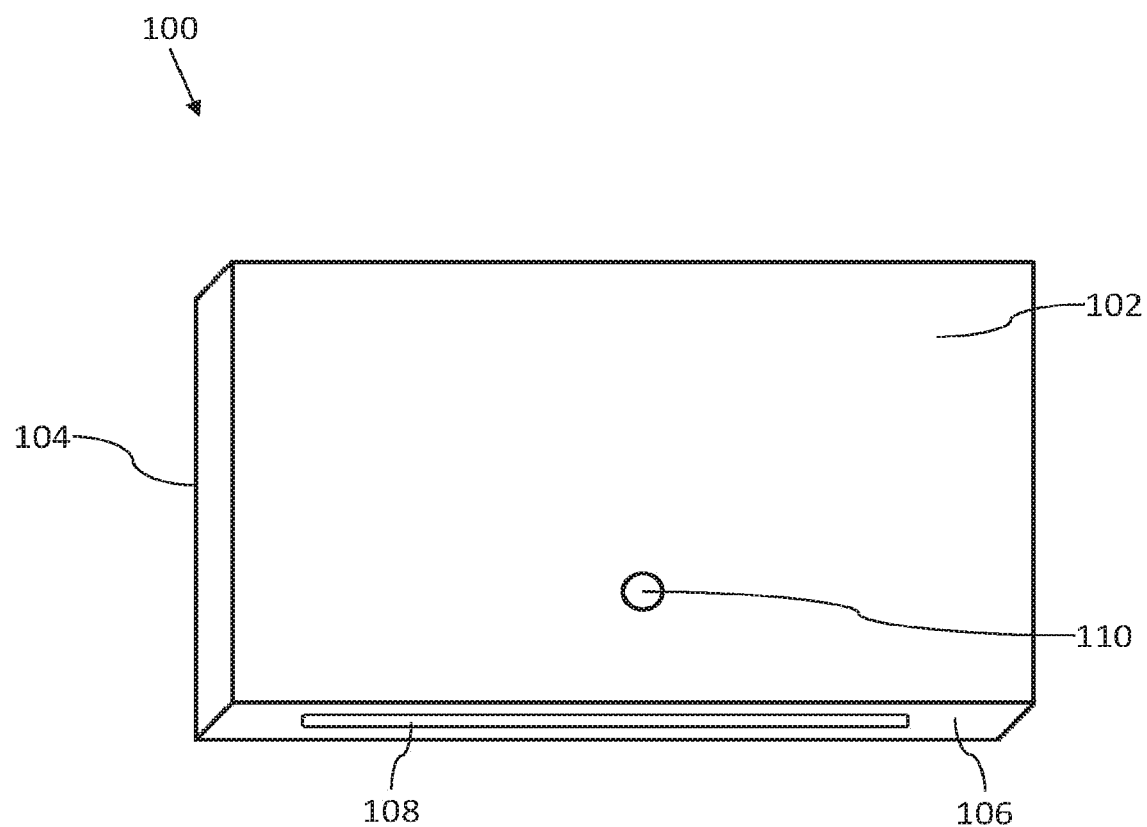
FIG. 1 illustrates a perspective view of an example arrangement of a dispensing apparatus 100.

FIG. 1 illustrates an example arrangement of a dispensing apparatus 100. Apparatus 100 may include a cover 102, a rear wall 104, at least one side wall 106, and a dispensing port 108. Apparatus 100 may be formed from any of a variety of materials, including for example: a polymer, a metal, an alloy, an organic material, and the like. Apparatus 100 may include any of a variety of shapes necessary to store and dispense sheet materials.

Apparatus 100 may include at least one sensor 110. At least one sensor 110 may include any of a variety of sensors configured to activate apparatus 100 to cause at least one article of sheet material to be dispensed. Sensor 110 may be operatively connected to at least one of a printed circuit board, a power source, and a power supply.

In one embodiment, sensor 110 is a capacitive sensor configured to sense the presence of a user's body part, such as the user's hand, in the proximity of apparatus 100. The capacitive sensor may relay the sensing of the proximity of a user's hand to a printed circuit board (not shown), which may cause an electric motor (not shown) to rotate a supply roller (not shown), which may cause a single article of a sheet material to be dispensed from apparatus 100. Sensor 110 may be a capacitive sensor oriented within apparatus 100, rather than on cover 102. That is, no sensor may be present on cover 102 in one embodiment, but rather the sensor may be contained within apparatus 100b.

In another embodiment, sensor 110 is an infrared sensor. Sensor 110 may be a passive infrared sensor. Sensor 110 may sense motion. Sensor 110 may sense motion of a user near apparatus 100. Sensor 110 may sense motion of a user's hand waved near apparatus 100, thus indicating that the user requests the dispensing of at least one article of a sheet material from apparatus 100.

Sensor 110 may include a light sensor configured to sense lights activated near apparatus 100, such that the activation of lights near apparatus 100 causes apparatus 100 to dispense an article of a sheet material. Sensor 110 may be a touch sensor, such that a user physically touches sensor 110 when the user desires the dispensing of a sheet material from apparatus 100. Sensor 110 may include a microphone, and may sense noise caused by a user, which may cause apparatus 100 to automatically dispense a sheet material from apparatus 100 in anticipation of a user desiring an article of sheet material. Sensor 110 may include a microphone configured to permit voice recognition capabilities, such that a user may speak a specific word or term to cause the dispensing of a sheet material from apparatus 100. Sensor 110 may sense temperature, such as the body heat of a user present near apparatus 100, and may dispense an article of sheet material in anticipation of a user desiring an article of sheet material. Sensor 110 may include an RFID reader configured to sense the presence of a tag in the possession of a user, such that an article of sheet material is only dispensed to specific users. Sensor 110 may include a shock sensor configured to sense a user moving near apparatus 100, touching apparatus 100, tapping on apparatus 100 with an object or body part, or the like, after which apparatus 100 may dispense an article of a sheet material.

Sensor 110 may be in communication with an external surface of apparatus 100. Sensor 110 may be contained completely internally within apparatus 100.

In one embodiment, apparatus 100 does not include a sensor 110, but rather includes a switch actuated by a user when requesting the dispensing of a an article of sheet material. The switch may include any of a variety of switches configured to close a circuit, including for example, a button. In another embodiment, apparatus 100 includes both sensor 110 and a switch.

In one embodiment, apparatus 100 may include, with or without sensor 110, wireless networking capabilities, such that apparatus 100 may be remotely activated via a Bluetooth connection, a Wi-Fi connection, a radio signal, a cellular signal, or the like.

Figure 2A:
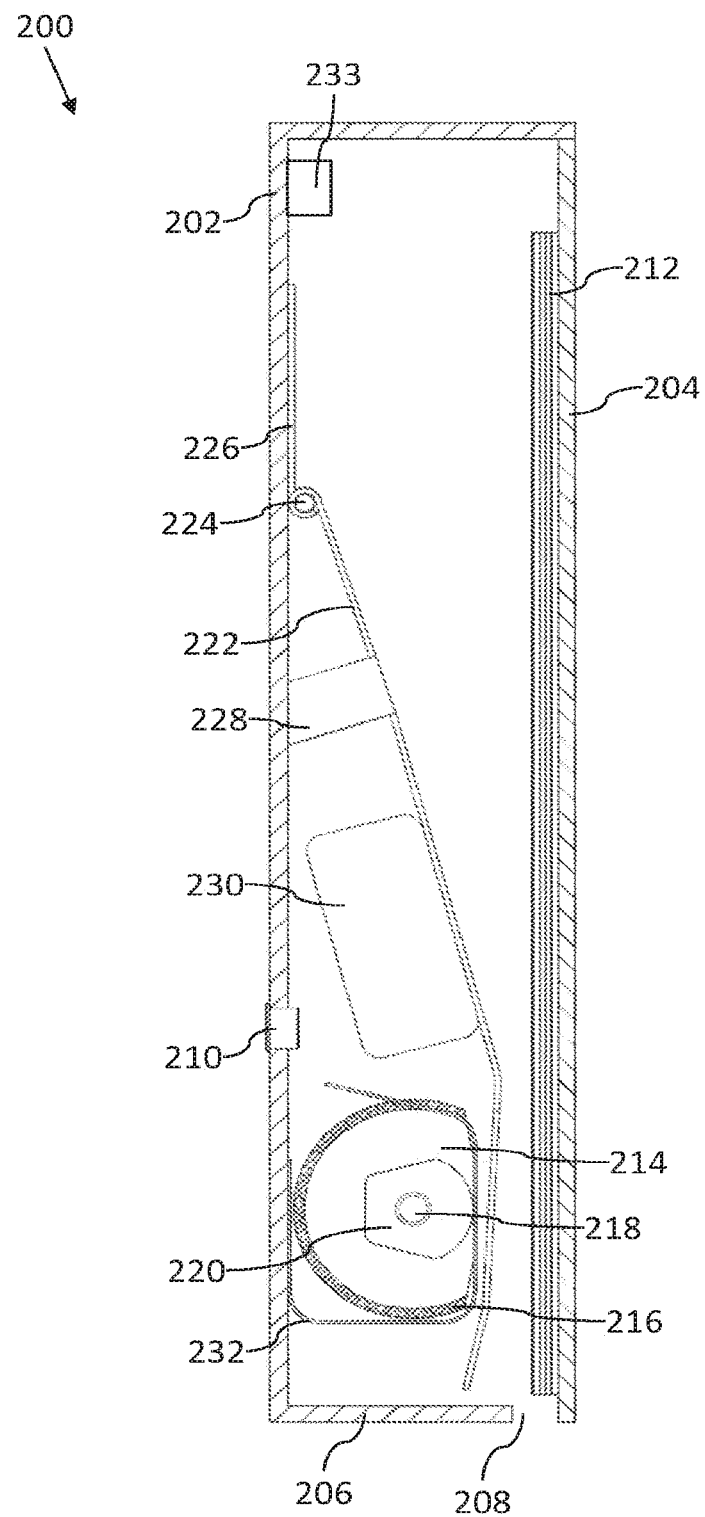
FIG. 2A illustrates a sectional view of an example arrangement of a dispensing apparatus 200.
Figure 2B:
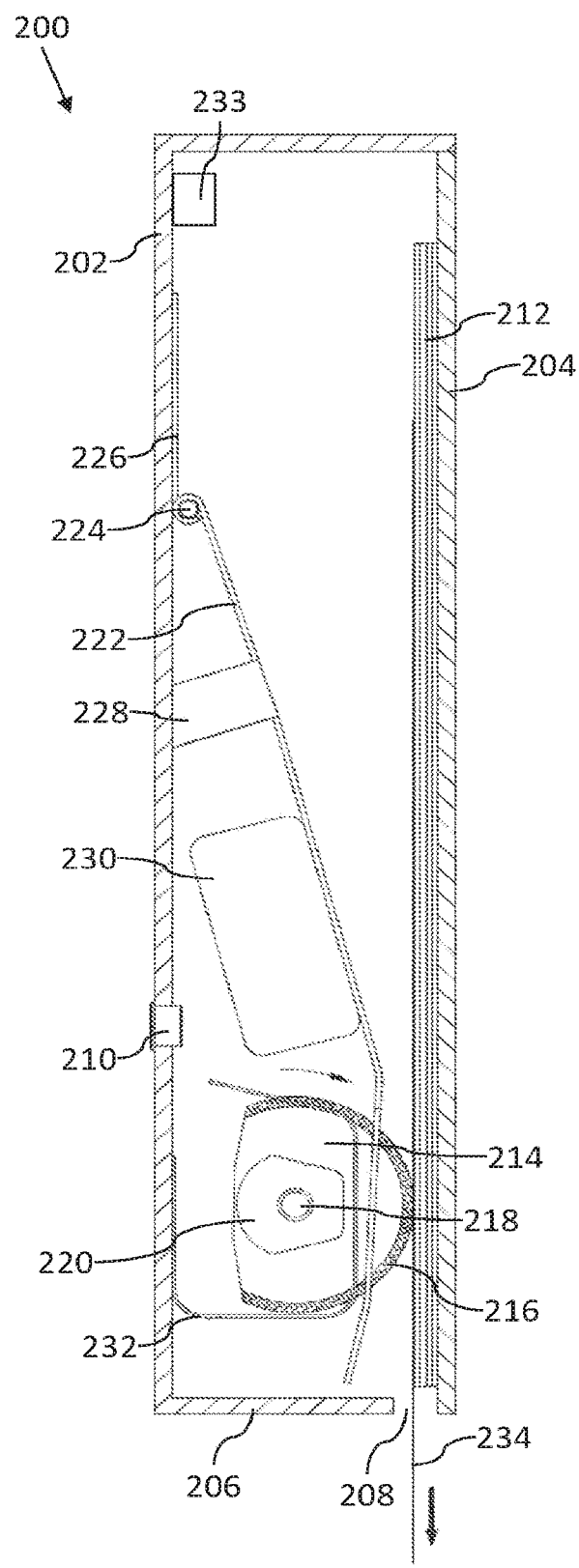
FIG. 2B illustrates a sectional view of an example arrangement of dispensing apparatus 200.

FIGS. 2A and 2B illustrate an example arrangement of a dispensing apparatus 200. Dispensing apparatus 200 may include a cover 202, a rear wall 204, and at least one side wall 206. Dispensing apparatus 200 may include a sensor 210.

Apparatus 200 may include at least one dispensing port 208. Dispensing port 208 may be oriented in at least one side wall 206. Dispensing port 208 may be configured and positioned to permit the passage of an article of a sheet material 212 to pass through dispensing port 208.

Cover 202 may be selectively removable to allow one to access the interior of apparatus 200. Cover 202 may be removably connected to rear wall 204 via any of a variety of mechanisms, including at least one of a hinge, a fastener, a friction fit, a sliding channel, clips, and the like. Cover 202 may be a door.

Rear wall 204 may be connected to a surface, such as a wall, a floor, a ceiling, another object, a post, and the like. Rear wall 204 may be permanently connected to a surface, or removably connected to a surface.

One or more sheet materials 212 may be contained within apparatus 200. Sheet materials 212 may be oriented in a stack. Sheet materials 212 may be oriented in a stack on a card, wherein the card contains the sheet materials 212 in the stack, and may act as a substrate to attach sheet materials 212 to an interior surface of apparatus 200. Sheet materials 212 may be attached to, or oriented near, rear wall 204.

Apparatus 200 may include at least one supply roller 214. Supply roller 214 may be configured to rotate. Supply roller 214 may be operatively connected to a motor (not shown). Supply roller 214 may be configured to contact at least one article of sheet material 212. Supply roller 214 may contact at least one article of sheet material 212 while rotating, causing the at least one article of sheet material 212 to be dispensed through dispensing port 208. Supply roller 214 may have an abrasive, soft, tacky, or otherwise increased friction exterior surface. Supply roller 214 may include a rubber coating 216 oriented about at least a portion of its exterior surface.

Supply roller 214 may have truncated cylinder shape, such that when supply roller 214 is oriented as illustrated in FIG. 2A, it is not in contact with sheet material 212. As such, supply roller 214 may have a radiused portion and a truncated portion. Rubber coating 216 may not extend completely about supply roller 214, but rather, may only extend about that portion of supply roller that is radiused.

Supply roller 214 may be operatively connected to a rotation shaft 218. Shaft 218 may be operatively connected to a motor (not shown). Supply roller 214 may be directly connected to shaft 218. Shaft 218 may extend at least partially through supply roller 214.

Apparatus 200 may include a retracting roller 220. Retracting roller 220 may include a radiused portion and at least one flat, truncated portion. In one embodiment, retracting roller 220 includes a radiused portion, and three flat, truncated portions. Retracting roller 220 may be operatively connected to a motor (not shown). Retracting roller 220 may be configured to rotate. Retracting roller 220 may be configured to rotate with supply roller 214. Retracting roller 220 may rotate directly with supply roller 214, such that retracting roller 220 and supply roller 214 rotate the same amount as one another, for example, 360 degrees.

Retracting roller 220 may be operatively connected to a rotation shaft 218. Shaft 218 may be operatively connected to a motor (not shown). Retracting roller 220 may be directly connected to shaft 218. Shaft 218 may extend at least partially through retracting roller 220.

Retracting roller 220 may include a radiused portion that is directed in a first direction, while supply roller 214 may have a radiused portion that is directed in a second direction, and the first and second directions may be opposite one another (about 180 degrees from one another).

Apparatus 200 may include a mounting plate 222. Mounting plate 222 may include one or more substantially planar portions separated by bends. Mounting plate 222 may be connected to an interior of cover 202, rear wall 204, or side wall 206. Mounting plate 222 may be connected to an interior of apparatus 200 by any of a variety of mechanisms, including for example a fastener 224. Mounting plate 222 may be connected to a fixing plate 226, which may be connected to an interior of apparatus 200, including for example, an interior surface of cover 202. Mounting plate 222 may be connected to fixing plate 226 via fastener 224. Fastener 224 may include any of a variety of fasteners. Fastener 224 may include a shaft forming a hinge. Mounting plate 222 may be hingedly connected to fixing plate 226. Fastener 224 may be a fixing shaft.

Mounting plate 222 may be operatively connected to at least one of supply roller 214, retracting roller 220, and shaft 218. Mounting plate 222 may be connected to supply roller 214, retracting roller 220, and shaft 218.

Mounting plate 222 may be additionally connected to cover 202 via at least one supporting tab 228. Supporting tabs 228 may act as struts to support mounting plate 222. In one embodiment, mounting plate 222 may deflect during dispensing of sheet material 212. Mounting plate 222 may bend about at least one supporting tab 228.

Mounting plate 222 may include an electronics box 230. Electronics box 230 may contain at least some of the electronics of apparatus 200. Electronics box 230 may include for example a power source, such as a battery or a direct connection to electricity running through a building. Electronics box 230 may also include at least one printed circuit board. Electronics box 230 may include at least one programmable controller chip. Electronics box 230 may include circuitry and other wiring necessary for the operation of apparatus 200. For example, sensor 210 may be in electrical communication with electronics box 230. As another example, a motor (not shown) may be in electrical communication with electronics box 230. A power source may include at least one of: a battery, electricity from wall receptacle, electricity from a generator, a solar panel, a photo panel, and the like.

In one embodiment, electronics box 230 includes a programmable controller chip. The programmable controller chip may be programmed to allow at least one of: the adjustment of the period of time for which the motor (illustrated in FIG. 3 at 340) is operated to discharge one piece of sheet material 212; the indication of a low accumulator or battery charge level by giving a light and/or audio signal; the recognition of the appropriate sheet material 212 (e.g., proprietary material); the connection of a coin recognition system; the storage and playback of promotional and awareness raising audio materials.

In one embodiment, a power source is located within dispenser 200, but outside of electronics box 230. The power source may be a battery oriented within dispenser 200 near mounting plate 222, but outside of electronics box 230.

Electronics box 230 may include a counter (not shown) configured to count the number of dispenses of sheet material 212. Electronics box 230 may include a counter (not shown) configured to count the number of dispenses of sheet material 212 and alert a user when dispenser 200 is out of sheet material 212. Electronics box 230 may include a counter (not shown) configured to count the number of dispenses of sheet material 212 and alert a user when dispenser 200 is almost out of sheet material 212 and has dispensed an amount specified. For example, a user may desired to be alerted when 10% or less of sheet material 212 is remaining in dispenser 200. Thus, electronics box 230 may alert a user when 90% of sheet material 212 has been dispensed.

In one embodiment, dispenser 200 includes an aperture (not shown) in cover 202, which may allow a user to visually inspect the quantity of sheet material 212 remaining in dispenser 200. In one embodiment, a sheet material card (not shown) may be colored with a color significantly contrasting with the color of sheet material 212. A user may visually inspect and recognize the color of the sheet material card, thus knowing that dispenser 200 is empty. Alternatively, rear wall 204 may include a color significantly contrasting with the color of sheet material 212.

In one embodiment, dispenser 200 includes a light or other signal that is activated upon the dispensing of all of sheet material 212, or a specified quantity of sheet material 212 (e.g., 90%).

In one embodiment, electronics box 230 may include a reset button, which reset button may indicator that a full stack of sheet material 212 has been inserted into dispenser 200, after which electronics box 230 may start over its counting of the number of sheet materials 212 dispensed.

Mounting plate 222 comprising a biasing material, which when bent, may provide a force against bending in an attempt to be straight. Mounting plate 222 may comprise a spring steel, polymer, organic material, laminated material, alloy, composite, or the like.

Stated differently, when mounting plate 222 is deflected due to contact between supply roller 214 and sheet material 212, mounting plate 222 may provide a bias against this deflection, providing a force to keep supply roller 214 in contact with sheet material 212. When mounting plate 222 is deflected due to contact between retracting roller 220 and a supporting plate 232 connected to an interior surface of apparatus 200, mounting plate 222 may provide a bias against this deflection, providing a force to keep retracting roller 220 in contact with supporting plate 232. Mounting plate 222 may be flexible.

Supporting plate 232 may at least partially circumvent retracting roller 220.

Supporting plate 232 may be operatively connected to apparatus 200. Supporting plate may be operatively connected to an interior surface of cover 202. Supporting plate may be connected to an interior surface of cover 202. Supporting plate may be connected to any interior surface of apparatus 200.

Retracting roller 220 may engage supporting plate 232 at some point during the rotation of retracting roller 220. Retracting roller 220 may be configured to engage supporting plate 232 to limit the translation of supply roller 214 toward sheet material 212.

As illustrated in FIG. 2B, a dispensed sheet 234 may be advanced through dispensing port 208.

Dispenser 200 may include a code reader 233. Code reader 233 may be configured to read a proprietary code located on one or more of sheet material 212, a sheet material card (not shown), or the like. In one embodiment, code reader 233 seeks a proprietary code located on one or more of sheet material 212, a sheet material card (not shown), or the like. If code reader 233 cannot locate the necessary proprietary code, dispenser 200 may be deactivated to prevent damage, jamming, or other difficulties caused by the dispensing of non-proprietary sheet material 212.

Code reader 233 may be an RFID reader, where sheet material 212 or a sheet material card (not shown) includes a proprietary RFID tag.

Code reader 233 may be a magnetic sensing system. The magnetic sensing system code reader 233 may sense and/or read a magnetic strip oriented on sheet material 212 or a sheet material card (not shown). The magnetic strip may include proprietary codes to prevent use of non-proprietary sheet material 212. The magnetic strip may be printed on sheet material 212 or a sheet material card. The magnetic strip may be adhered to sheet material 212 or a sheet material card.

Code reader 233 may include any reader, existing or to be developed in the future, that may communicate with sheet material 212 or a sheet material card to ensure that proprietary material is being dispensed from dispenser 200.

Code reader 233 may be a bar code reader, where sheet material 212 or a sheet material card (not shown) includes a proprietary bar code.

Figure 3:
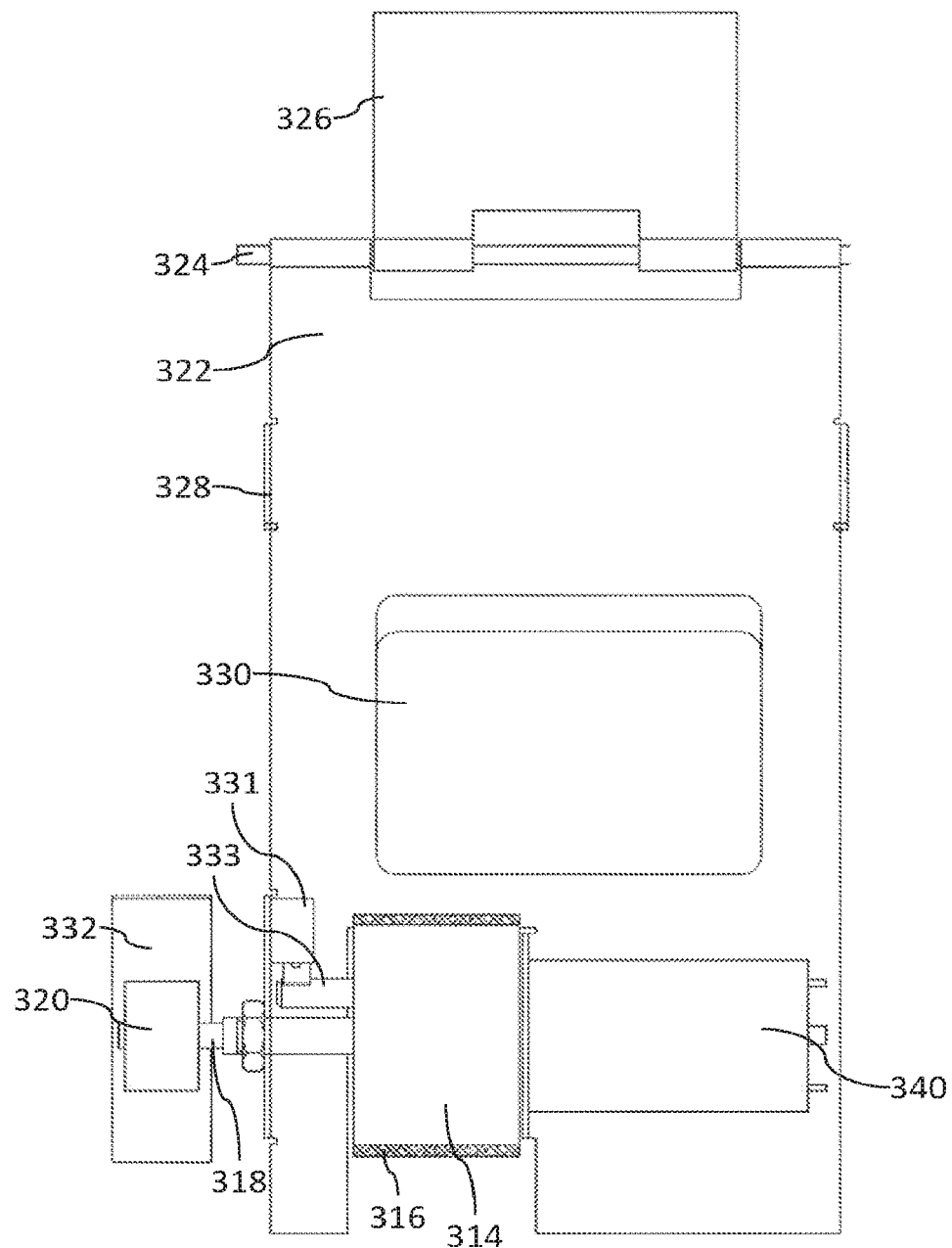
FIG. 3 illustrates an elevational view of an example arrangement of a dispensing apparatus.

FIG. 3 illustrates an example arrangement of a dispensing apparatus. The apparatus may include a fixing plate 326, a fastener 324, a mounting plate 322, at least one supporting tab 328, an electronics box 330, a supporting plate 332, a retracting roller 320, a supply roller 314, the supply roller 314 having a rubber coating 316, and a shaft 318 operatively connected to the retracting roller 320, and the supply roller 314.

A motor 340 may be operatively connected to shaft 318. Motor 340 may cause shaft 318 to rotate, which may in turn cause retracting roller 320 and supply roller 314 to rotate. As retracting roller 320 rotates, it may disengage supporting plate 332, which may allow supply roller 314 to contact a sheet material (e.g., sheet material 212). As supply roller 314 rotates, it may pull a single article of the sheet material from its stack and cause it to advance from the apparatus. As supply roller 314 continues to rotate, retracting roller 320 may engage supporting plate 332, causing supply roller 314 to retract away from the stack of sheet material, and thus allowing a user to withdraw the article of sheet material from the apparatus without restriction.

Motor 340 may be an electric motor powered by a battery oriented within the apparatus. Motor 340 may be an electric motor powered by an electrical source exterior to the apparatus.

An aperture may be formed in mounting plate 322 for the supply roller 314. The aperture may allow supply roller 314 to extend beyond the plane of mounting plate 322 during supply roller 314's movement.

In one embodiment, a microswitch 331 is fixed on mounting plate 322, at the side toward supply roller 314. A microswitch activating cam 333 may extend from a side of supply roller 314. Microswitch activating cam 333 may contact microswitch 331, causing motor 340 to stop while supply roller 314 is in a retracted position. Microswitch 331 may ensure that motor 340 only complete one single revolution (about 360 degrees) upon each activation of motor 340.

Figure 4:
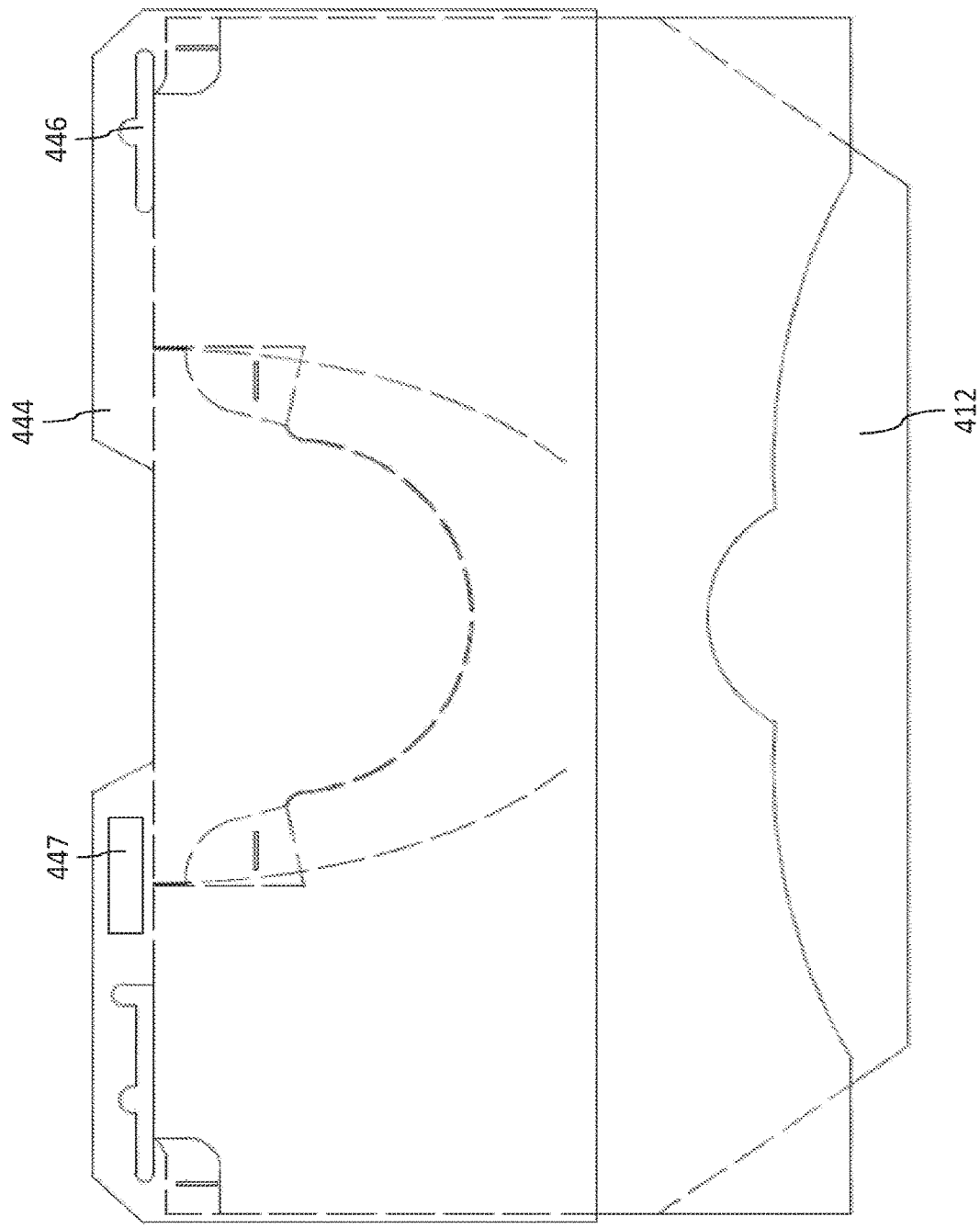
FIG. 4 illustrates an elevational view of an example arrangement of a sheet material card containing multiple sheets 412.

FIG. 4 illustrates example arrangement of a sheet material card containing multiple sheets 412. The sheet material card may include a plurality of sheets 412 stacked on top of one another. Sheets 412 may be folded, such that the dispenser apparatus would dispense a folded sheet, and the user would unfold the sheet prior to use. Sheets 412 may not be folded. Sheets 412 may be mounted directly to a substrate 444. Substrate 444 may include at least one sheet mounting aperture 446 configured to engage at least a portion of a dispensing apparatus (e.g., rear wall 204 illustrated in FIGS. 2A and 2B).

In one embodiment, sheets 412 are connected to substrate 444 via a perforated connection that is configured to break upon application of force from a supply roller. In another embodiment, sheets 412 are connected to substrate 444 via a limited connection that is configured to break upon application of force from a supply roller. In this manner, sheets 412 may be removed from substrate 444 without tearing sheet 412 in its main body. Sheets 412 may be connected to substrate 444 via staples, which may permit sheet 412 to be easily torn from substrate 444. Sheets 412 may be connected to substrate 444 via an adhesive or glue, which may permit sheet 412 to be easily torn from substrate 444.

The sheet material card may include a coded element 447. Coded element 447 may be oriented on substrate 444. Coded element 447 may be oriented on sheets 412. Coded element 447 may include a proprietary RFID tag. Coded element 447 may include a proprietary bar code.

FIGS. 5A-5J illustrate an example arrangement of a retracting roller 520, a sheet supply roller 514, and a sheet material 512. Supply roller 514 may include a rubber coating 516. Supply roller 514 and retracting roller 520 may be connected to a shaft 518.

Retracting roller may engage a supporting plate 532. Supporting plate 532 is illustrated simply in FIGS. 5A-5J to avoid the illustration of supporting plate 532 interfering with the view of retracting roller 520 and supply roller 514. It is understood, however, that the portion of supporting plate 532 illustrated in FIGS. 5A-5J may be the only portion of supporting plate 532 that retracting roller 520 engages during operation of the dispensing apparatus.

Sheet material 512 may be oriented in a stack. Sheet material 512 may be attached to a substrate 544. Sheet material 512 may be connected to substrate 544 via a limited connection 548 configured to break, tear, or otherwise disconnect upon application of a force upon a single sheet 512 by supply roller 514.

Figure 5A:
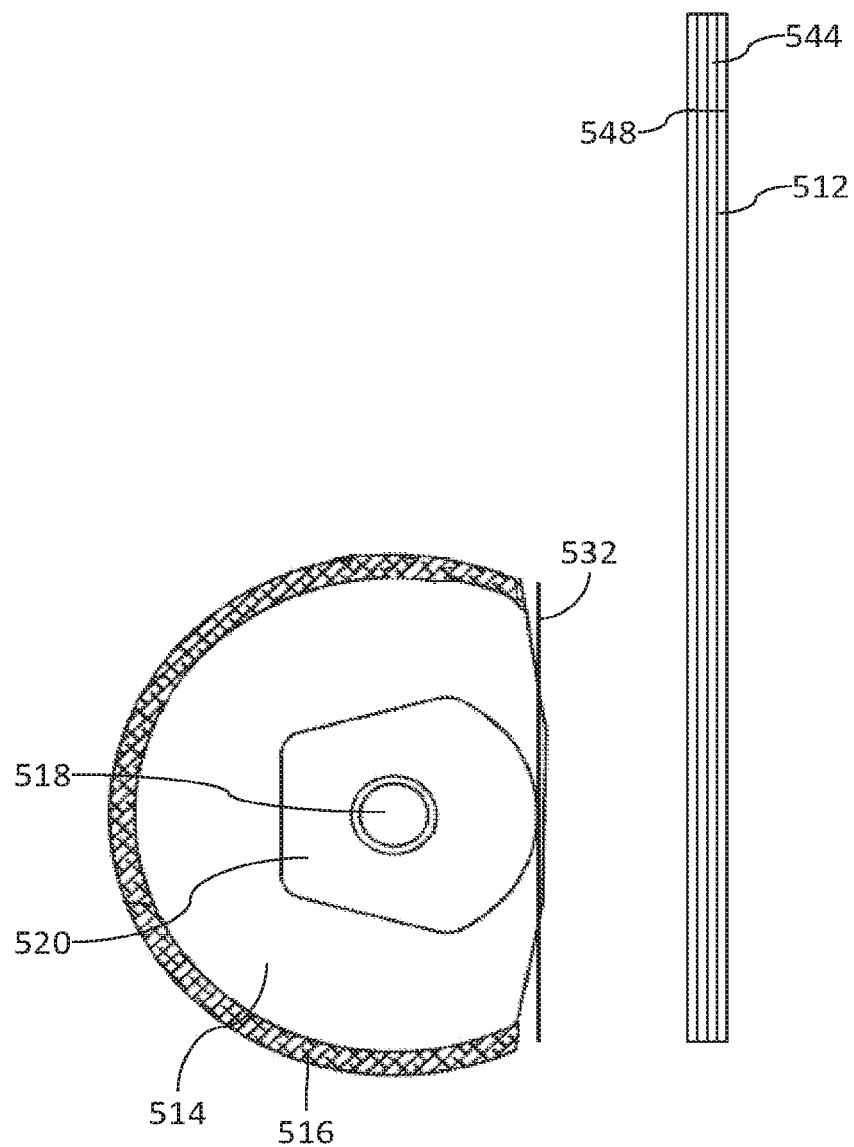
FIG. 5A illustrates an example arrangement of a retracting roller 520, a sheet supply roller 514, and a sheet material 512.

As illustrated in FIG. 5A, the radiused portion of supply roller 514 is oriented away from sheet material 512 between dispensing of articles of sheet material 512. The radiused portion of the retracting roller 520 is oriented toward sheet material 512 between dispensing of articles of sheet material 512.

Figure 5B:
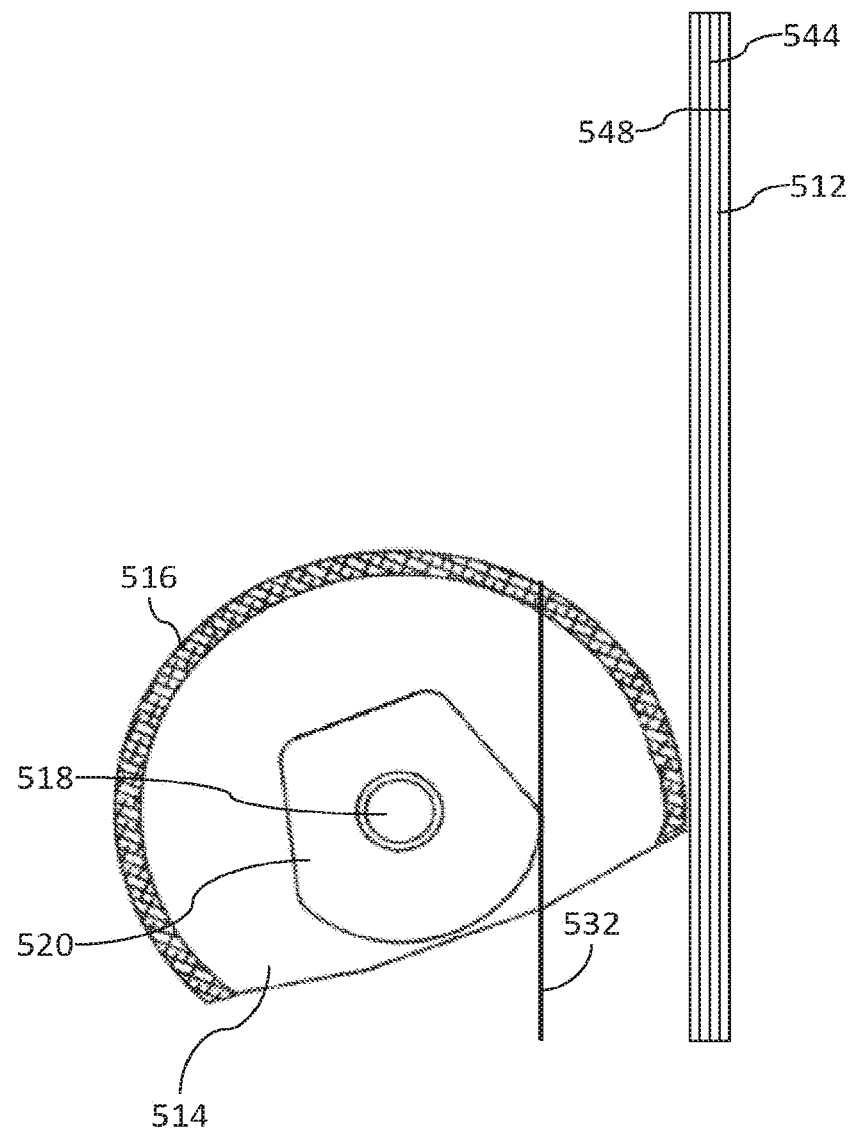
FIG. 5B illustrates an example arrangement of retracting roller 520, sheet supply roller 514, and sheet material 512.
Figure 5C:
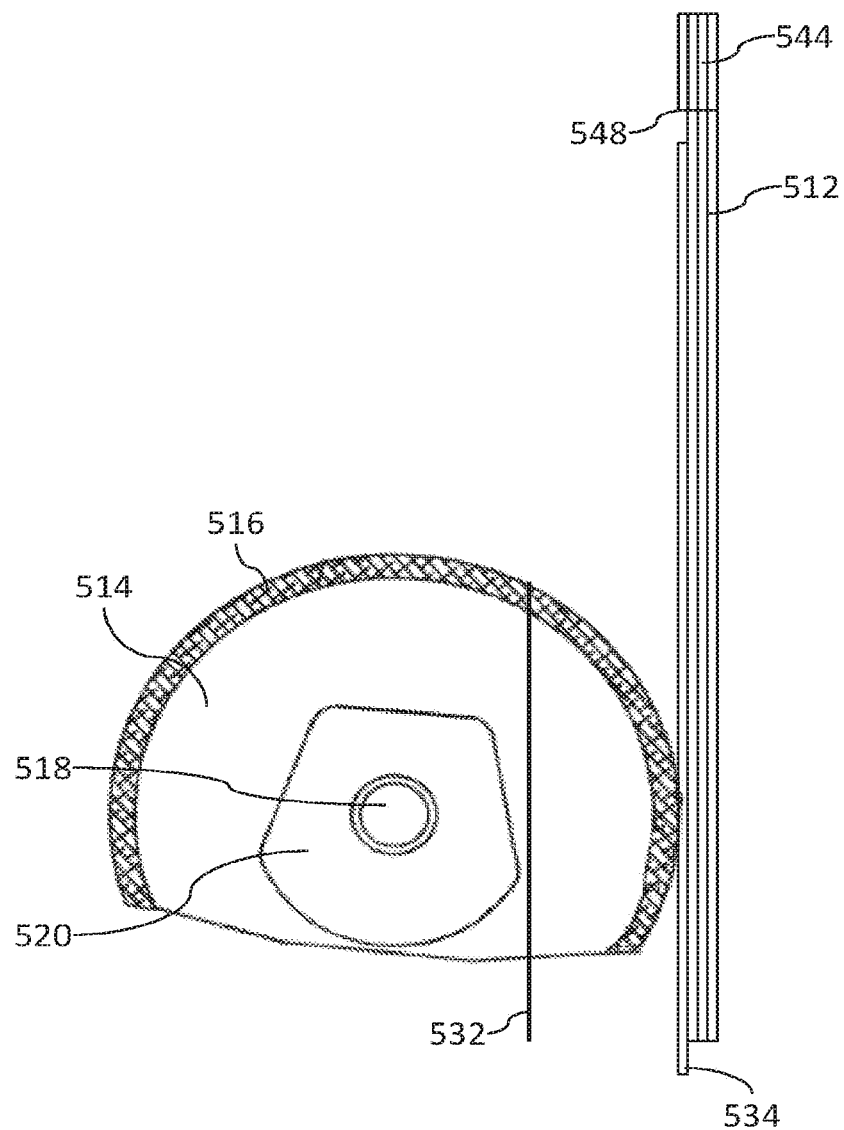
FIG. 5C illustrates an example arrangement of retracting roller 520, sheet supply roller 514, and sheet material 512.
Figure 5D:
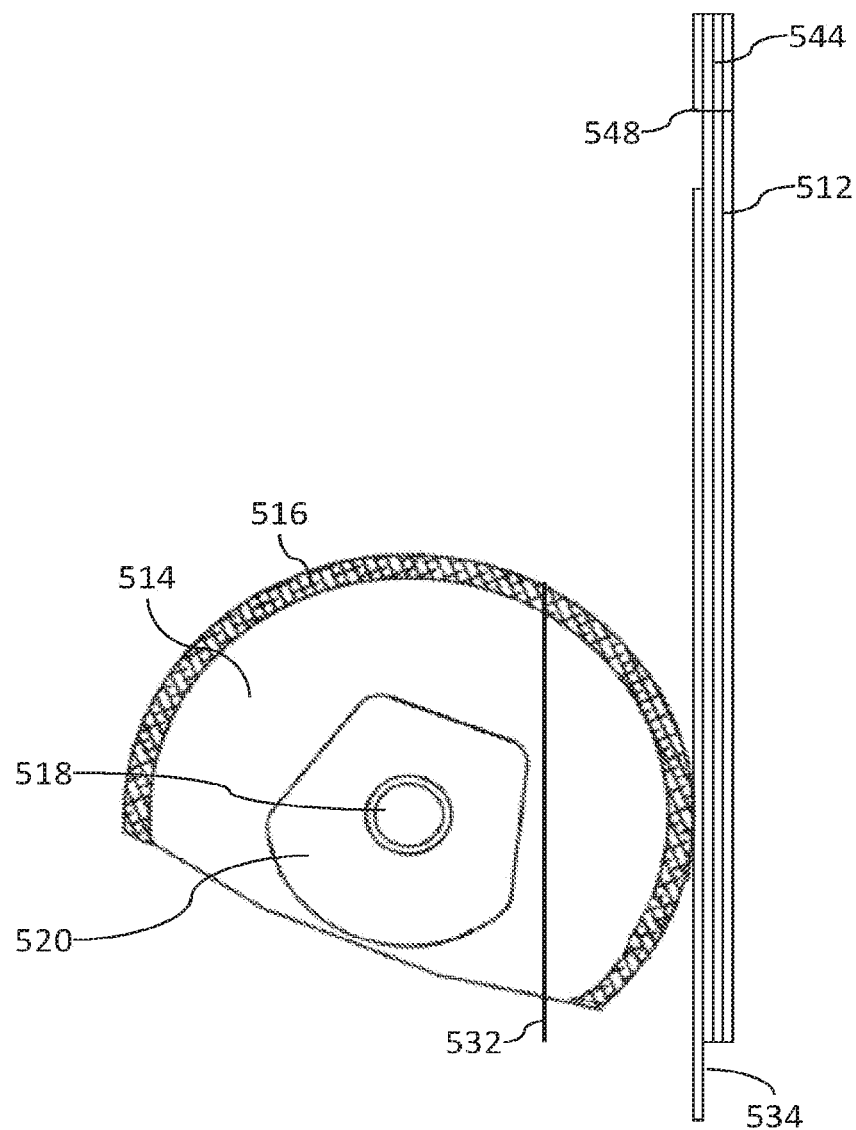
FIG. 5D illustrates an example arrangement of retracting roller 520, sheet supply roller 514, and sheet material 512.
Figure 5E:
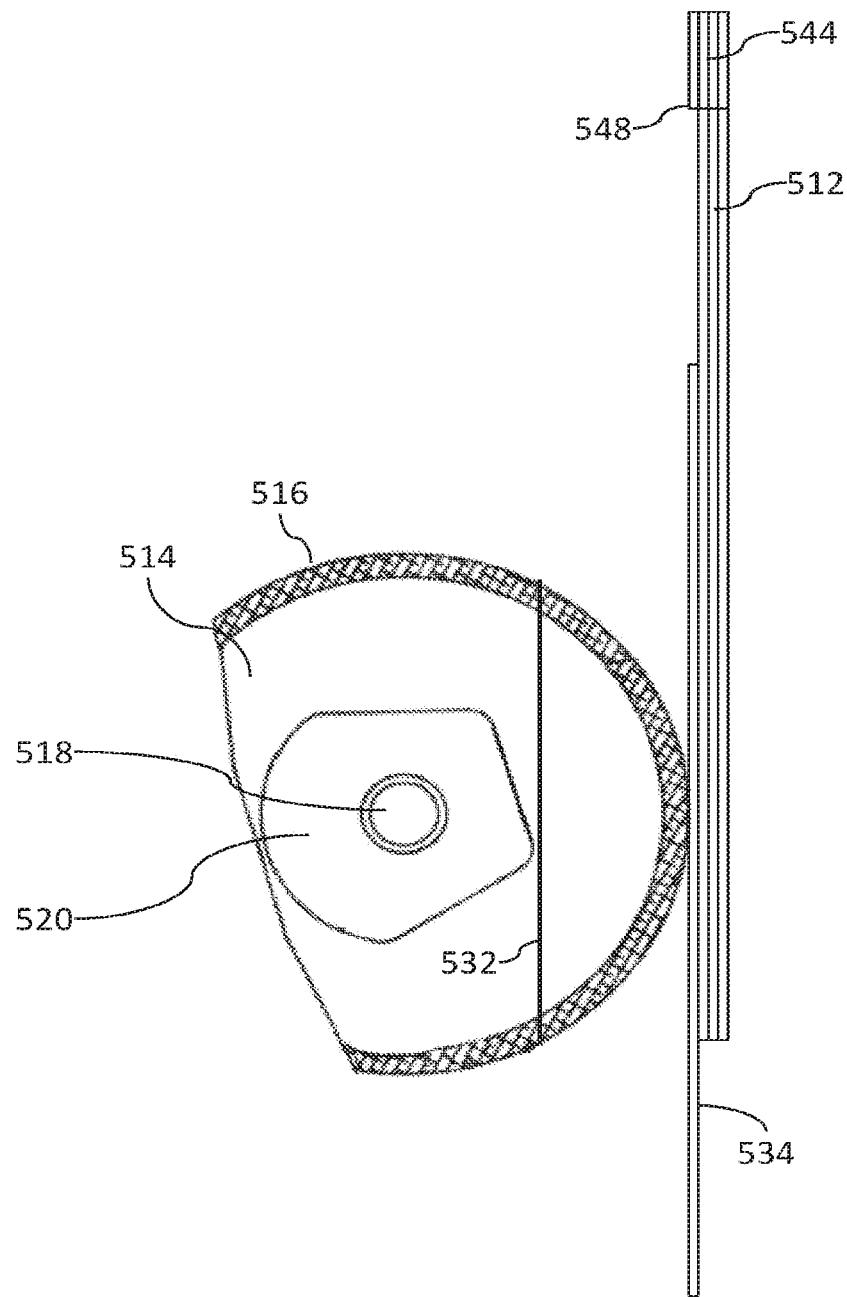
FIG. 5E illustrates an example arrangement of retracting roller 520, sheet supply roller 514, and sheet material 512.
Figure 5F:
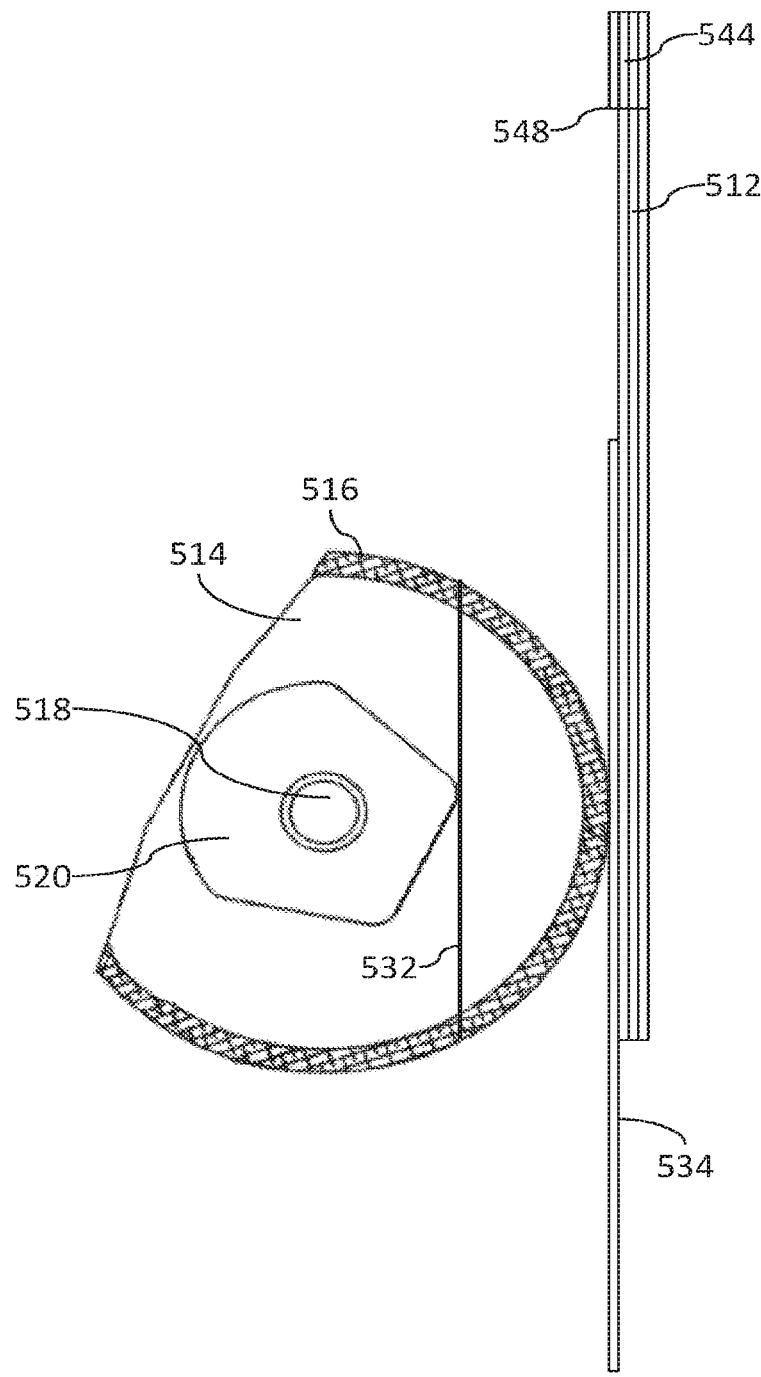
FIG. 5F illustrates an example arrangement of retracting roller 520, sheet supply roller 514, and sheet material 512.
Figure 5G:
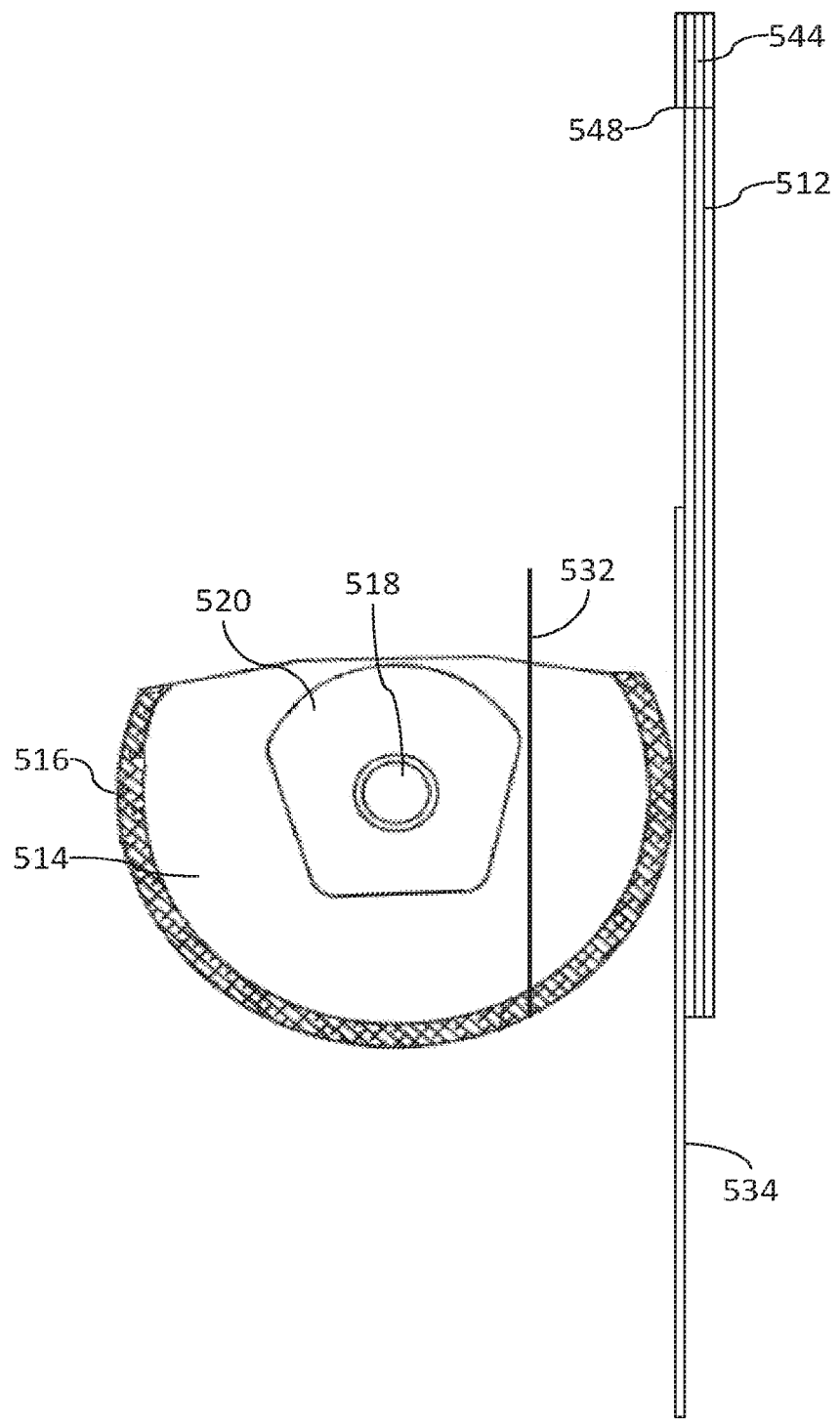
FIG. 5G illustrates an example arrangement of retracting roller 520, sheet supply roller 514, and sheet material 512.

Upon initiation of a dispensing operation, supply roller 514 and retracting roller 520 rotate clockwise (see FIG. 5B). FIGS. 5C-5G illustrate supply roller 514 contacting and dispensing a dispensed sheet 534, while retracting roller 520 is rotated such that its radiused portion is out of contact with supporting plate 532. As a result of retracting roller 520 rotating out of contact with supporting plate 532, supply roller 514 is permitted to be translated into contact with sheet material 512 due to biasing of mounting plate (222 in FIGS. 2A and 2B).

Figure 5H:
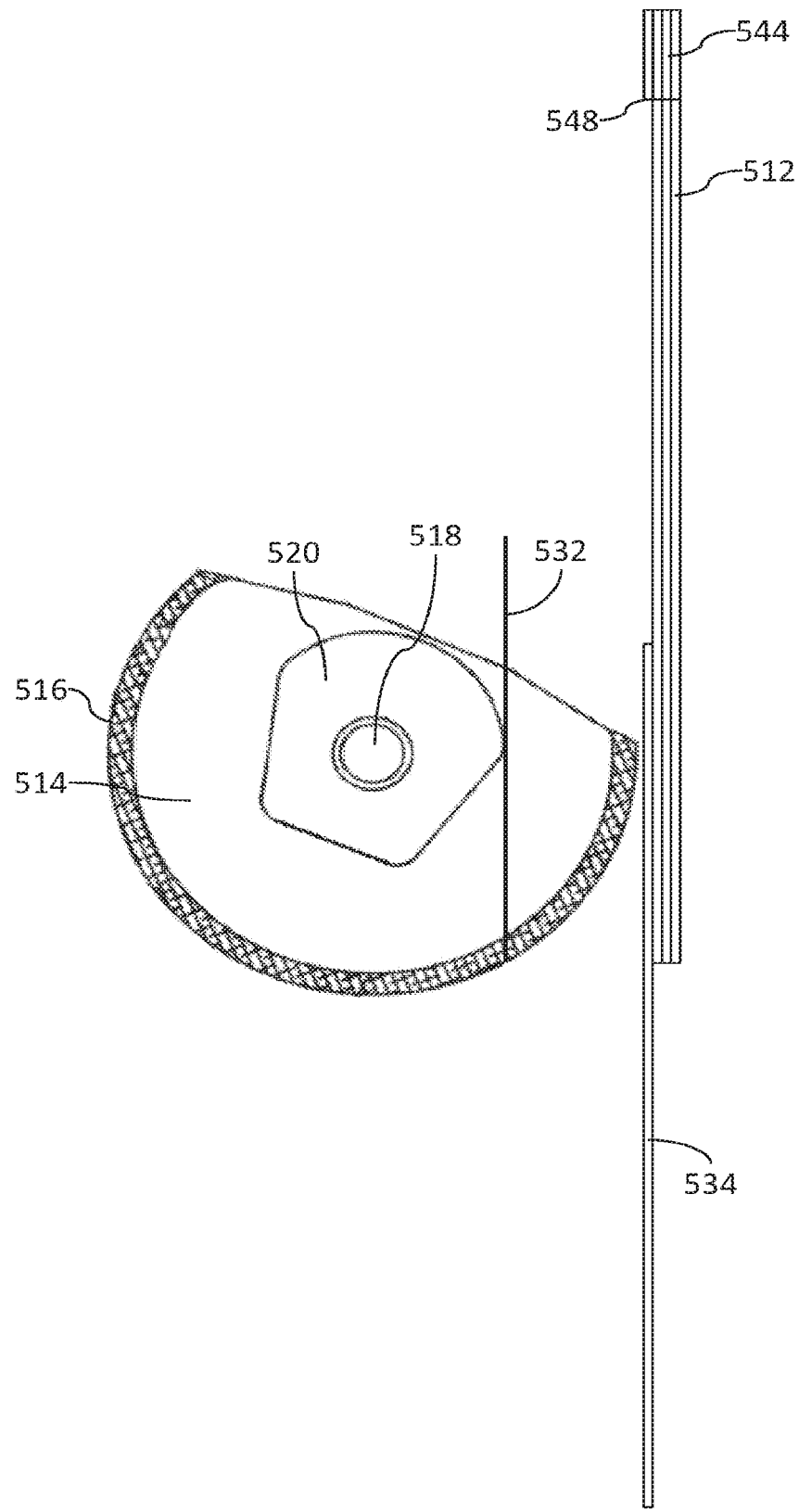
FIG. 5H illustrates an example arrangement of retracting roller 520, sheet supply roller 514, and sheet material 512.
Figure 51:
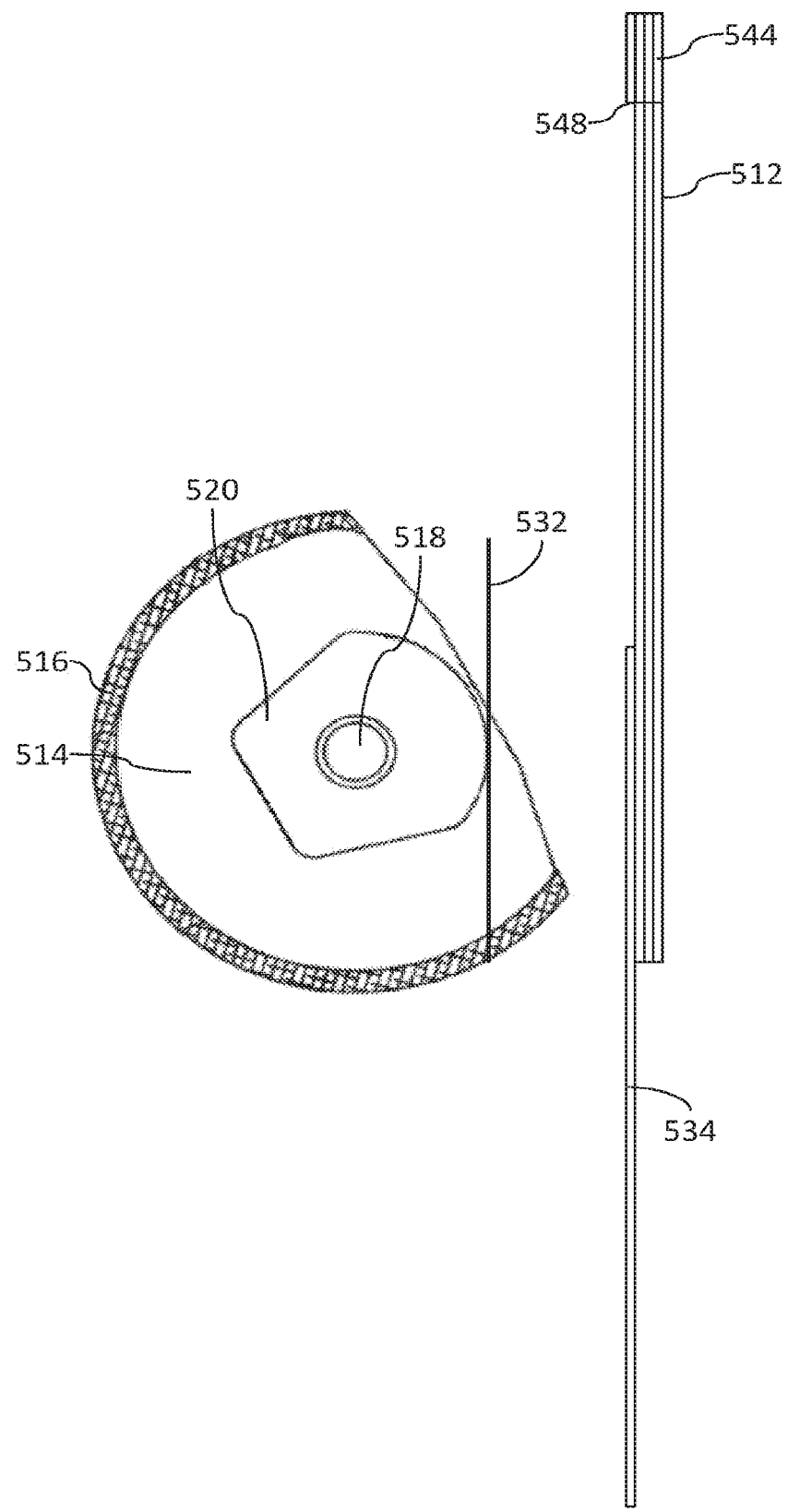

FIG. 5H illustrates the radiused portion of retracting roller 520 again contacting supporting plate 532, causing supply roller 514 (and mounting plate 222) to move away from sheet material 512. As illustrated, supply roller 514 is removed from contact with sheet material 512 upon the radiused portion of retracting roller 520 contacting support plate 532.

Figure 5J:
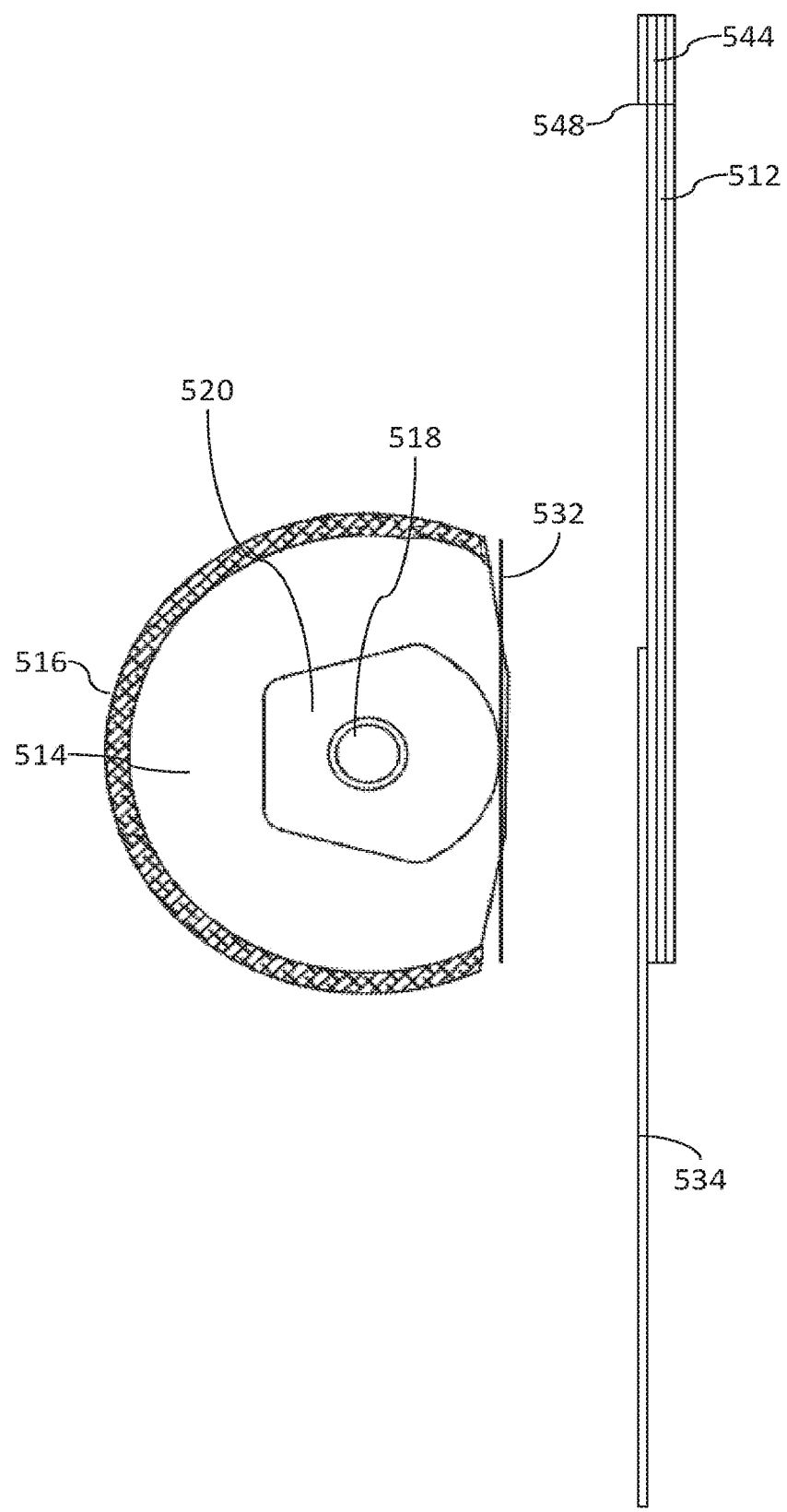
FIG. 5J illustrates an example arrangement of retracting roller 520, sheet supply roller 514, and sheet material 512.

FIGS. 5I and 5J illustrate supply roller 514 (and mounting plate 222) being forced to move further from sheet material 512. As a result, a user is able to draw dispensed sheet 534 from the apparatus, without any portion of dispensed sheet 534 engaging, snagging on, or otherwise contacting, any portion of the dispensing mechanism (retracting roller 520, supply roller 514, and mounting plate 222). In this manner, a user is able to remove dispensed sheet 534 without tearing it. In this manner, the dispenser is unlikely to jam, as the use of retracting roller 520 and supply roller 514, as described herein, provided surprising results in the reliability of the dispensing apparatus.

As illustrated, during dispensing of a single sheet material 512, supply roller 514 and retracting roller 520 may rotate about 360 degrees. In another embodiment, during dispensing of a single sheet material 512, supply roller 514 and retracting roller 520 may rotate more than about 360 degrees. In another embodiment, during dispensing of a single sheet material 512, supply roller 514 and retracting roller 520 may rotate less than about 360 degrees.

Figure 6:
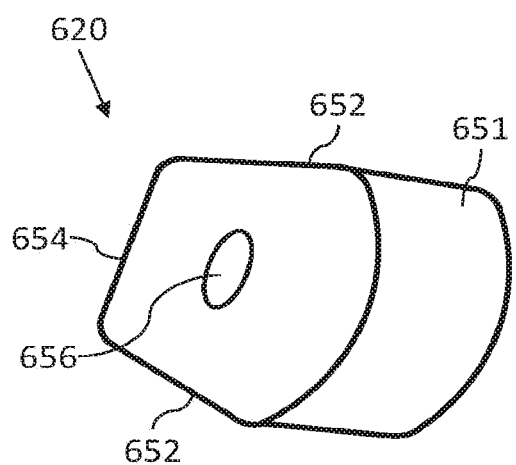
FIG. 6 illustrates a perspective view of a retracting roller 620.

FIG. 6 illustrates a retracting roller 620. Retracting roller 620 may include a radiused portion 651 and at least one truncated portion 652, 654. In one embodiment, retracting roller 620 includes two side truncated portions 652, and one rear truncated portion 654, rear truncated portion 654 being opposite radiused portion 651, and side truncated portions 652 being oriented between rear truncated portion 654 and radiused portion 651. Retracting roller 620 may include a shaft aperture 656 configured to accept a shaft, such as shaft 218, 318, 518.

Figure 7:
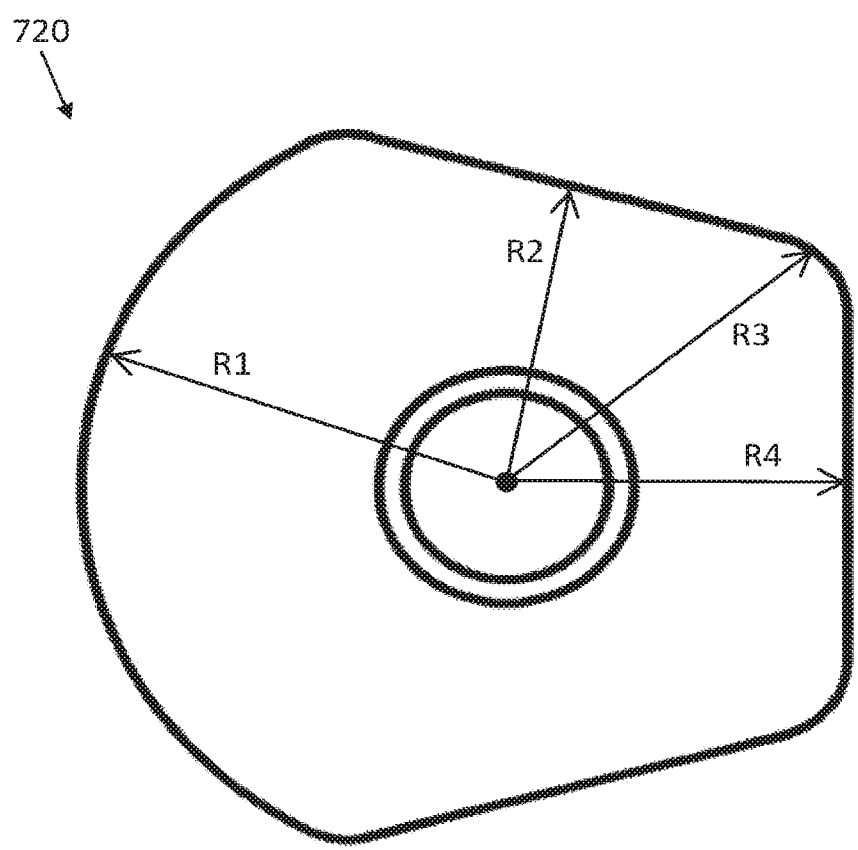
FIG. 7 illustrates an elevational view of a retracting roller 720.

FIG. 7 illustrates a retracting roller 720. As illustrated, retracting roller 720 may include a radiused portion having a radius R1. Retracting roller 720 may include side truncated portions having a radius R2. Retracting roller 720 may include rear corner portions having a radius R3. Retracting roller 720 may include a rear truncated portion having a radius R4. The value of R1 may be greater than the value of R2, R3, and R4. R3 may be greater than R2 and R4, but lesser than R1. R2 may be about equal to R4.

Retracting roller 720 may have an isosceles trapezoid-shaped cross-section, except that the longer base of the isosceles trapezoid has a curved, radiused portion (e.g., 651).

Figure 8:
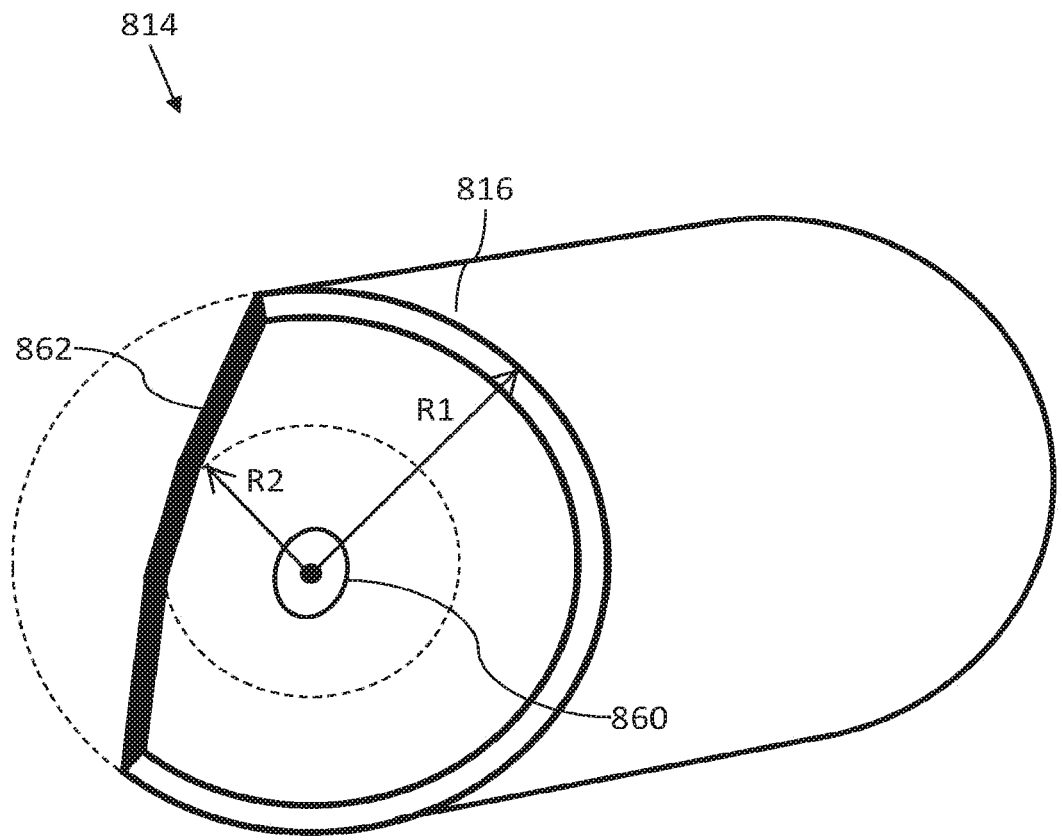
FIG. 8 illustrates a perspective view of a sheet supply roller 814.

FIG. 8 illustrates a sheet supply roller 814. Supply roller 814 may include a rubber coating 816 covering its radiused portion. Supply roller 814 may include a truncated portion 862. Supply roller 814 may include a shaft aperture 860 configured to accept a shaft, such as shaft 218, 318, 518. The radiused portion of supply roller 814 may have a radius R1. Truncated portion 862 may have a radius R2. The value of radius R1 may be greater than the value of R2.

In one embodiment, supply roller 814 about 70% of a complete cylinder, the 30% being removed to form the truncated cylinder.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Gamer, A Dictionary of Modern Legal Usage 624 (2d. Ed. 1995). Also, to the extent that the terms "in" or "into" are used in the specification or the claims, it is intended to additionally mean "on" or "onto." To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. To the extent that the term "substantially" is used in the specification or the claims, it is intended to mean that the identified components have the relation or qualities indicated with degree of error as would be acceptable in the subject industry. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A sheet material dispensing apparatus, comprising:
   a shaft operatively connected to a supply roller and a retracting roller, wherein the retracting roller has a radiused portion and at least one truncated portion;
   a motor configured to cause the shaft to rotate;
   an activating cam operatively connected to the supply roller;
   microswitch operatively associated with the activating cam, the microswitch being configured to limit operation of the motor;
   a supporting plate engaged and disengaged by the retracting roller during operation, wherein the disengagement of the radiused portion from the supporting plate causes the supply roller to translate toward a wall of the apparatus; and
   at least one article of sheet material housed within, the apparatus.

2. The sheet material dispensing apparatus of claim 1, further comprising, an electronics box having a counter configured to count a number of dispenses of the at least one article of sheet material.

3. The sheet material dispensing apparatus of claim 1, wherein the retracting roller includes three truncated portions.

4. The sheet material dispensing apparatus of claim 1, wherein the radiused portion of the supply roller includes a rubber coating.

5. The sheet material dispensing apparatus of claim 1, wherein the engagement of the radiused portion of the retracting roller to the supporting plate causes the supply roller to retract front the wall and away from the at least one article of sheet material.

6. The sheet material dispensing apparatus of claim 1, further comprising a flexible mounting plate operatively connected to at least one of the supply roller, the retracting roller and the shaft, wherein the flexible mounting plate is configured to deflect or bend about at least one supporting tab during dispensing of the at least one article of sheet material.

7. The sheet material dispensing apparatus of claim 1, Wherein the supply roller has a radius portion and at least one truncated portion.

8. The sheet material dispensing apparatus of claim 7, wherein the radiused portion of the supply roller is directed in a first direction and the radiused portion of the retracting roller is directed in a second direction, the first direction being different from the second direction.

9. The sheet material dispensing apparatus of claim 8, whet ein the first and second directions are opposite one another.

10. The sheet material dispensing apparatus of claim 1, further comprising, a sensor configured to activate the motor, wherein the sensor includes one of a capacitive sensor, an infrared sensor, a light sensor, a touch sensor, a microphone, a temperature sensor, an RF 1:13 reader, and a shock sensor.

11. The sheet material dispensing apparatus of claim 10, further comprising a magnetic sensing system configured to sense a magnetic strip.

12. The sheet material dispensing apparatus of claim 11, further comprising a sheet material card configured to hold the at least one article of sheet material.

13. The sheet material dispensing apparatus of claim 12, further comprising a magnetic strip, wherein the magnetic strip is located at the sheet material card.

14. The sheet material dispensing apparatus of claim 1, further comprising a power source.

15. The sheet material dispensing apparatus of claim 14, wherein the power source includes one of a battery or an electrical source exterior to the apparatus.

16. A sheet material dispensing apparatus, comprising:
   at least one article of sheet material housed within the apparatus and configured to be dispensed therefrom;
   a shaft operatively connected to a supply roller and a retracting roller, wherein the retracting roller has a radiused portion and at least one truncated portion;
   a motor configured to cause the shaft to rotate;
   a sensor configured to activate the motor;
   an activating cam operatively connected to the supply roller, the activating earn including a microswitch configured to limit operation of the motor after activation by the sensor;

a supporting plate engaged and disengaged by the retracting roller during operation, wherein the disengagement of the radiused portion from the supporting plate causes the supply roller to translate toward a wall of the apparatus; and a flexible mounting plate operatively connected to at least one of the supply roller, the retracting roller and the shaft, wherein the flexible mounting plate is configured to deflect or bend about at least one supporting tab during dispensing of the at least one article of sheet material.

17. The sheet material dispensing apparatus of claim 16, wherein the engagement of the radiused portion of the retracting roller to the supporting plate causes the supply roller to retract from the wall and away from the at least one article of sheet material.

18. The sheet material dispensing apparatus of claim 16, further comprising:

an electronics box having a counter configured to count a number of dispenses of the at least one article of sheet material; and a power source including one of a battery or an electrical source exterior to the apparatus.

19. The sheet material dispensing apparatus of claim 16, wherein the supply roller has a radius portion and at least one truncated portion, wherein the radiused portion of the supply roller is directed in a first direction and the radiused portion of the retracting roller is directed in a second direction, the first direction being different from the second direction.

20. The sheet material dispensing apparatus of claim 19, wherein the first and second directions are opposite one another.

* * * * *

UNITED STATES PATENT AND TRADEMARK OFFICE
CERTIFICATE OF CORRECTION

PATENT NO. : 10,638,896 B2  
APPLICATION NO. : 16/431989  
DATED : May 5, 2020  
INVENTOR(S) : Vuylsteke et al.

Page 1 of 1

It is certified that error appears in the above-identified patent and that said Letters Patent is hereby corrected as shown below:

In the Claims

In Column 11, Line No. 60, Claim 1: "microswitch operatively associated with the activating"  
To be replaced with: "a microswitch operatively associated with the activating";

In Column 12, Line No. 26, Claim 7: "Wherein the supply roller has a radius portion and at least"  
To be replaced with: "wherein the supply roller has a radius portion and at least";

In Column 12, Line No. 37, Claim 10: "further comprising, a sensor configured to activate the"  
To be replaced with: "further comprising a sensor configured to activate the";

In Column 12, Line No. 40, Claim 10: "microphone, a temperature sensor, an RF 1:13 reader, and a"  
To be replaced with: "microphone, a temperature sensor, an RFID reader, and a".

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*